United States Patent
Schmerts

(10) Patent No.: US 7,398,110 B2
(45) Date of Patent: Jul. 8, 2008

(54) METHOD AND APPARATUS OF BANDWIDTH INDICATOR

(75) Inventor: David Schmerts, Bet Dagan (IL)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 10/874,190

(22) Filed: Jun. 24, 2004

(65) Prior Publication Data

US 2005/0288065 A1    Dec. 29, 2005

(51) Int. Cl.
*H04M 1/001*    (2006.01)
(52) U.S. Cl. .................. 455/566; 455/67.7; 455/67.11; 370/232; 709/219
(58) Field of Classification Search ............... None
See application file for complete search history.

(56) References Cited

U.S. PATENT DOCUMENTS

2002/0160817 A1* 10/2002 Salmimaa et al. .......... 455/566
2002/0174214 A1* 11/2002 Carl et al. ................... 709/224
2004/0203416 A1* 10/2004 Hata et al. .................. 455/67.7
2004/0203698 A1* 10/2004 Comp ......................... 455/421
2005/0113028 A1* 5/2005 Uchida et al. ............... 455/67.7
2005/0124331 A1* 6/2005 Munje et al. ................ 455/418

OTHER PUBLICATIONS iPAQ Networking Wireless PC Card Manual, 2001, Compaq Computer Corporation, p. 12 and 13.*

* cited by examiner

*Primary Examiner*—Lester G. Kincaid
*Assistant Examiner*—Dung Lam
(74) *Attorney, Agent, or Firm*—Pearl Cohen Zedek Latzer, LLP

(57) ABSTRACT

Briefly, in accordance with one embodiment of the invention, an indicator to indicate a parameter of data transportation is provided. In standby mode, the indicator may indicate a parameter related to an estimated available bandwidth and in an active mode, the indicator may indicate a parameter related to a data throughput. A method for indicating the parameter of data transportation is also provided.

9 Claims, 2 Drawing Sheets

METHOD AND APPARATUS OF BANDWIDTH INDICATOR

BACKGROUND

Cellular-phone transceivers, for example mobile stations such as hand held devices, mobile devices and the like, may include a received signal strength indicator (RSSI) to display an indication of the received signal strength (RSS), a battery power level indicator, or the like. In new generations of cellular systems, the load of data transportation over wireless channels may increase. In order to be aware of the data transportation load, an operator of the cellular-phone transceiver may need indication that may help the operator to monitor the data transportation load.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
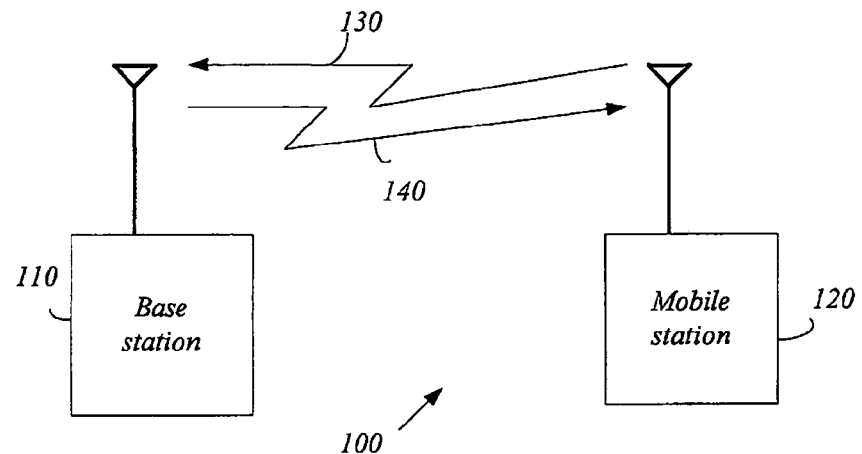
FIG. 1 is an illustration of a wireless communication system according to some exemplary embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the circuits and techniques disclosed herein may be used in many apparatuses such as transceivers of a radio system. Transceivers intended to be included within the scope of the present invention include, by way of example only, portable communication devices that may include cellular radiotelephone transmitters and receivers, and the like.

Types of cellular radiotelephone transceivers intended to be within the scope of the present invention include, although are not limited to, Code Division Multiple Access (CDMA), CDMA 2000 and wide band CDMA (WCDMA) cellular radiotelephone transceivers for transmitting spread spectrum signals, Global System for Mobile communication (GSM) cellular radiotelephone transceivers, Time Division Multiple Access (TDMA) transmitters, Extended-TDMA (ETDMA) transceivers for transmitting and receiving amplitude modulated (AM) and phase modulated signals, portable digital communication (PDC) phone, dual mode or multi modes transceivers and the like.

Some embodiments of the invention may be implemented, for example, using a machine-readable medium or article which may store an instruction or a set of instructions that, if executed by a machine (for example, by a station, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Turning first to FIG. 1, a block diagram of a wireless communication system 100 according to some exemplary embodiments of the present invention is shown. According to embodiments of the invention, wireless communication system 100 may include a base station and/or a plurality of base stations, and a mobile station and/or a plurality of mobile stations. For simplicity, a base station 110 and a mobile station 120 are shown.

Although the scope of the present invention is not limited in this respect, links, such as for example, an uplink and a downlink may be used to transfer communications which may include voice and data between base station 110 and mobile station 120. An uplink 130 may transfer communications from mobile station 120 to base station 110, and a downlink 140 may transfer communications from base station 110 to mobile station 120. Additionally, uplink 130 and downlink 140 may include one or more channels, which may be used for voice and data transportation.

Although the scope of the present invention is not limited in this respect, mobile station 120 may include a display to indicate, among other things, one or more parameters which may be related to the data transportation. For example, mobile station 120 may be a cellular phone and the indicator may be a data rate bar indicator and/or data progress bar indicator and/or estimated bandwidth bar indicator and the like. It should be understood that other forms of indications such as, for example, text, animation, light, sounds or the like may be used to indicate parameters that may be related to the data transportation.

Figure 2:
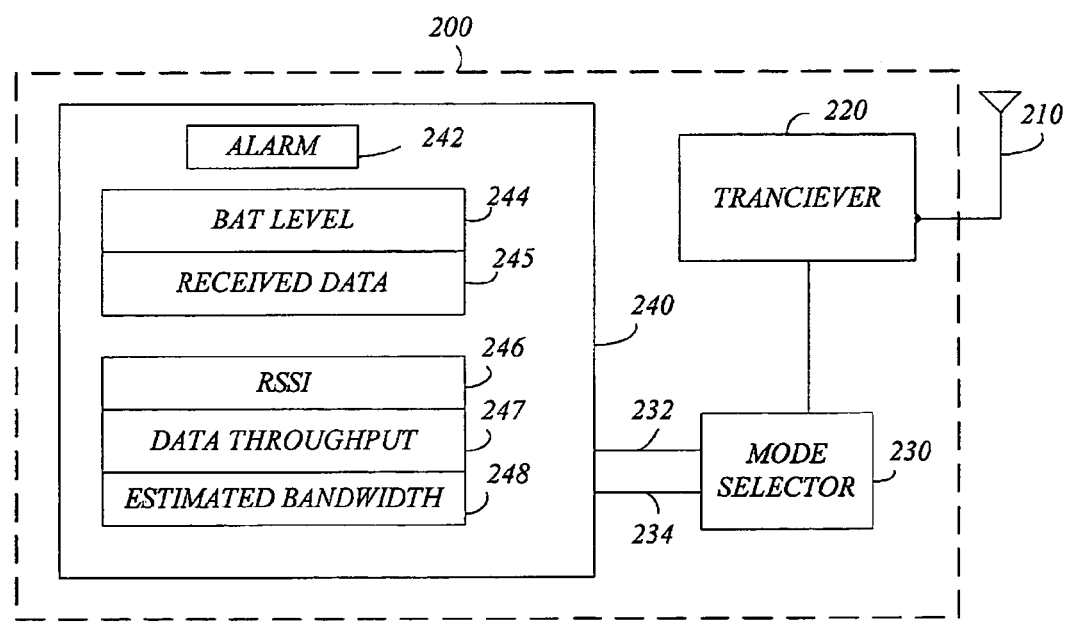
FIG. 2 is a block diagram of a mobile station in accordance with an exemplary embodiment of the present invention.

Turning to FIG. 2, a mobile station 200 in accordance with an exemplary embodiment of the present invention is shown. Although it should be understood that the scope and application of the present invention is in no way limited to this example, the mobile station 200 may be, for example, a hand held device, a vehicular phone, cellular phone, a personal communication assistant (PCA) or the like.

According to some embodiments of the invention, mobile station 200 may include an antenna 210, a transceiver 220, a mode selector 230, and a display 240. Although the scope of the present invention is not limited in this respect, display 240 may include the following indicators: an alarm 242, a battery level indicator 244, a received data rate indicator 245, a received signal strength indicator (RSSI) 246, a data throughput indicator 247 and an estimated data bandwidth indicator 248.

In operation, antenna 210 may be used to transmit and/or to receive radio frequency (RF) signals of a cellular-phone communication system, if desired. Antenna 210 may be, for example, a single antenna, a dual antenna, an internal antenna, a dipole antenna, a monopole antenna or the like. Transceiver 220 may include a receiver and transmitter to receive and/or transmit RF signals via antenna 210, if desired. In some embodiment of the invention transceiver 220 may be a cellular transceiver, a wireless local network transceiver, a Bluetooth transceiver, or the like.

Although the scope of the present invention is not limited in this respect, mobile station 200 may operate in several operation modes. For example, mobile station 200 may operate in standby mode, active mode, data mode and/or voice and text mode (e.g. short message service (SMS)). In this exemplary embodiment of the invention, mode selector 230 may have two control lines, a control line 232 and a control line 234. For example, in a standby mode, control line 232 may control display 240 to display the estimated data bandwidth indicator 242 and in an active mode, to display the data throughput indicator 247 and the received data indicator, if desired.

Although the scope of the present invention is not limited in this respect, estimated data bandwidth indicator 248 may display the estimated data bandwidth. For example, the indicator may be a bar indicator and the bars may be displayed according to the flowing exemplary algorithm. For example, threshold values may be set for the bars. When an estimated data bandwidth value crosses a first threshold a first bar may be displayed. When an estimated data bandwidth value crosses a second threshold first and second bars may be displayed and etc. It should be understood that the algorithm may be applied to all the bars in the indicator and may operate in the opposite way, e.g. not display bars when the estimated data bandwidth is below a desired threshold. According to an exemplary embodiment of the invention, a threshold may be the sum of received bits per a predetermined time interval. According to some embodiments of the invention, received data indicator 245 may be a bar display and may display the received data progress. Data throughput indicator 247 my display the data rate for example, 1 Megabit per second.

Although the scope of the present invention is not limited it this respect, mobile station 200 may be a cell phone device which may display battery level 244 and RSSI 245. In those embodiments of the invention, control line 234 of mode selector 230 may command display 240 to display battery level 244 and/or RSSI 245 in voice and text mode and may display received data indicator 245 and data throughput indicator 247 in data mode. In case that the battery level and/or the RSSI level will be under a predefined threshold, alarm 242 may be activated to alarm the user, although the scope of the present invention is not limited in this respect.

Figure 3:
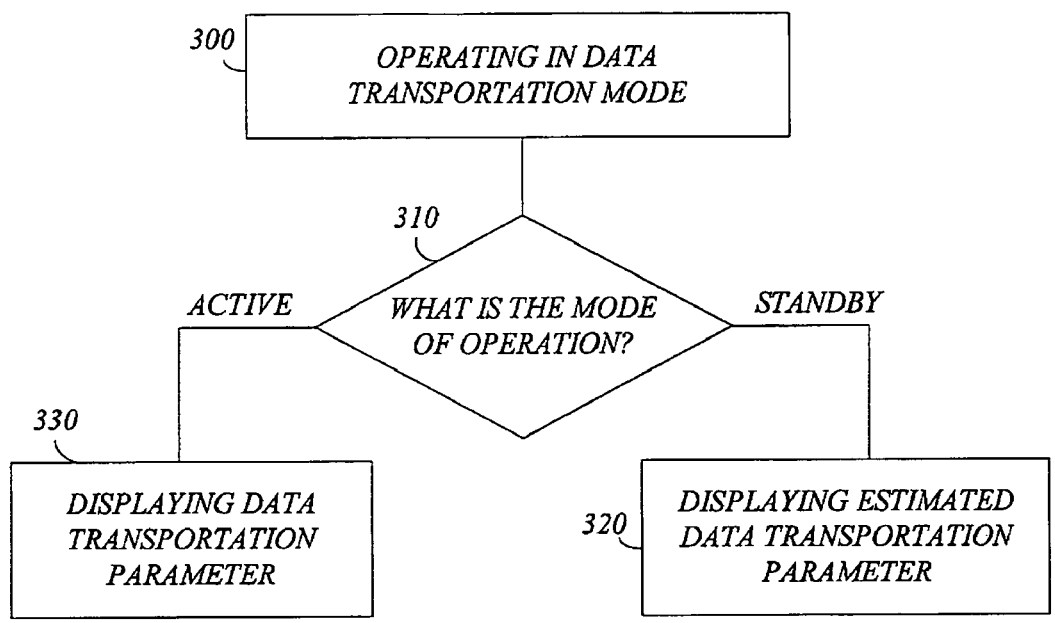
FIG. 3 is a flow chart of a method of indicating data transportation parameters that may be used in accordance with exemplary embodiments of the present invention.

Turning to FIG. 3, a flow chart of a method of indicating parameters related to data transportation that may be used in accordance with exemplary embodiment of the present invention is shown. Although the scope of the present invention is not limited in this respect, mobile station 200 may be operated in data transportation mode (block 300). In this mode mobile station 200 may be either in standby mode or active mode (block 310). According to some embodiments of the invention, in standby mode mobile station 200 may display estimated data transportation parameter for example, estimated data bandwidth (block 320). In active mode mobile station 200 may display at least one data transportation parameter such as, for example received data progress, data throughput, data rate or the like.

While certain features of the invention have been illustrated and described herein, many modifications, substitutions, changes, and equivalents will now occur to those skilled in the art. For example, the use of an adaptive function for varying a phase and amplitude of an output signal may be used in many devices other than transmitters. It is, therefore, to be understood that the appended claims are intended to cover all such modifications and changes as fall within the true spirit of the invention.

What is claimed is:

1. A cell phone comprising:

a display to display a battery level indicator, a received signal strength indicator, an estimated data bandwidth indicator, data throughput indicator, and a received data indicator; and a mode selector having a first control line and a second control line to control said display, wherein said first control line controls said display to display at least one of the group including said battery level indicator and said received signal strength indicator in a voice and text mode of the cell phone and said second control line controls said display to display said estimated data bandwidth indicator in a standby mode of the cell phone and at least one of the group including said data throughput indicator and said received data indicator in an active mode of the cell phone.

2. The cell phone of claim 1, comprising:

a warning indication to indicate if a battery power level is below a desired threshold.

3. The cell phone of claim 1, comprising:

a warning indication to indicate if a received signal strength is below a desired threshold.

4. A cell phone comprising:

a dipole antenna to transmit and receive data;

a display to display a battery level indicator, a received signal strength indicator, an estimated data bandwidth indicator, a data throughput indicator, and a received data indicator; and a mode selector having a first control line and a second control line to control said display, wherein said first control line controls said display to display at least one of the group including said battery level indicator and said received signal strength indicator in a voice and text mode of the cell phone and said second control line controls said display to display said estimated data bandwidth indicator in a standby mode of the cell phone and at least one of the group including said data throughput indicator and said received data indicator in an active mode of the cell phone.

5. The cell phone of claim 4, comprising:

a warning indication to indicate if a battery power level is below a desired threshold.

6. The cell phone of claim 4, comprising:

a warning indication to indicate if a received signal strength is below a desired threshold.

7. A wireless communication system comprising:

a cell phone comprising:

a display to display a battery level indicator, a received signal strength indicator, an estimated data bandwidth indicator, a data throughput indicator, and a received data indicator; and a mode selector having first control line and a second control line to control said display, wherein said first control line controls said display to display at least one of the group including said battery level indicator and said received signal strength indicator in a voice and text mode of the cell phone and said second control line controls said display to display said estimated data bandwidth indicator in a standby mode of the cell phone and at least one of the group including said data throughput indicator and said received data indicator in an active mode of the cell phone.

8. The wireless communication system of claim 7, wherein said cell phone further comprises:

a warning indication to indicate if a battery power level is below a desired threshold.

9. The wireless communication system of claim 7, wherein said cell phone further comprises:

a warning indication to indicate if a received signal strength is below a desired threshold.

* * * * *